(12) United States Patent
Blum et al.

(10) Patent No.: US 7,694,640 B2
(45) Date of Patent: *Apr. 13, 2010

(54) GUEST POSITIONING ASSEMBLY (75) Inventors: Steven C. Blum, Orlando, FL (US); David Winslow, Orlando, FL (US); Tim Kelley, Mt. Vernon, IA (US); Robert Scott Blucher, Orlando, FL (US)

(73) Assignee: Universal City Studios LLLP, Universal City, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 11/614,719

(22) Filed: Dec. 21, 2006

(65) Prior Publication Data

US 2008/0150344 A1 Jun. 26, 2008

(51) Int. Cl.
*B63B 17/00* (2006.01)

(52) U.S. Cl. .................... 114/343; 104/70; 104/72; 280/748; 297/487

(58) Field of Classification Search .................. 104/53, 104/62, 63, 64, 70, 72; 105/149.1, 149.2; 297/486, 487, 488; 472/59, 117; 280/748, 280/751, 753; 114/343
See application file for complete search history.

(56) References Cited

U.S. PATENT DOCUMENTS

| 1,597,491 | A | * | 8/1926 | Traver | 104/241 |
| 1,659,108 | A | * | 2/1928 | Illions | 104/241 |
| 2,165,698 | A | * | 7/1939 | Eyerly | 472/29 |
| 3,888,329 | A | * | 6/1975 | Monaghan | 280/734 |
| 4,005,877 | A | * | 2/1977 | Humphries | 280/748 |
| 4,930,808 | A | * | 6/1990 | Mikoll et al. | 280/751 |
| 5,100,173 | A | * | 3/1992 | Kudler | 280/748 |
| 5,238,265 | A | * | 8/1993 | Duce | 280/751 |
| 5,433,153 | A | * | 7/1995 | Yamada | 104/63 |
| 5,529,382 | A | * | 6/1996 | Burkat | 297/487 |
| 5,613,443 | A | * | 3/1997 | Ariga et al. | 104/70 |
| 5,853,193 | A | * | 12/1998 | Marshall | 280/748 |
| 6,095,926 | A | * | 8/2000 | Hettema et al. | 472/59 |
| 6,971,316 | B2 | * | 12/2005 | Hansen et al. | 104/53 |
| 7,506,602 | B2 | * | 3/2009 | Blum et al. | 114/343 |
| 2006/0232119 | A1 | * | 10/2006 | Hinteregger | 297/487 |
| 2008/0149017 | A1 | * | 6/2008 | Blum et al. | 114/343 |
| 2008/0150344 | A1 | * | 6/2008 | Blum et al. | 297/487 |
| 2008/0150345 | A1 | * | 6/2008 | Blum et al. | 297/487 |

FOREIGN PATENT DOCUMENTS

| DE | 2518715 A1 | 9/1976 |
| EP | 06000300 B | 9/1996 |
| EP | 0911224 A | 4/1999 |

OTHER PUBLICATIONS

U.S. Appl. No. 11/614,725, filed Dec. 21, 2006, Steven C. Blum.
U.S. Appl. No. 11/614,734, filed Dec. 21, 2006, Steven C. Blum.

* cited by examiner

*Primary Examiner*—S. Joseph Morano
*Assistant Examiner*—Jason C Smith
(74) *Attorney, Agent, or Firm*—GE Global Patent Operation; Roger C. Phillips; William J. Fitzpatrick

(57) ABSTRACT

A guest lap bar locking assembly for releasably positioning a lap bar within a water ride at an entertainment park includes a lap bar locking assembly that is dimensioned and configured to provide continuously variable position locking of the lap bar.

20 Claims, 9 Drawing Sheets

GUEST POSITIONING ASSEMBLY

CROSS REFERENCE TO RELATED APPLICATIONS

This application is related to U.S. Patent Application Publication No. 2008-0150345-A1, entitled "Guest Positioning Assembly", and U.S. Patent Application Publication No. 2008-0149017-A1, entitled "Guest Positioning Assembly", each being filed on the same date as this application, and the entire contents of each of which being incorporated herein by reference to the extent necessary to make and use the present invention.

BACKGROUND OF THE INVENTION

1. Field of the Invention

The subject matter described herein relates generally to devices and methods for entertaining guests and, more particularly, to positioning guests on a ride.

2. Related Art

Currently, log flume boats for entertainment venues such as theme parks and the like do not include guest positioning devices, e.g. restraints or lap bars, for positioning guests within a seat. In general, these log flume boats are single-wide and thus have a narrow hull which provides insufficient space for accommodating known guest positioning devices.

Known guest positioning devices in addition to requiring a substantially larger space than is available in a log flume boat, have a relatively high cost and are overly complex and heavy. For example, a known guest positioning device as found on the Jurassic Park River Attraction at Universal Studios, Islands of Adventure, is relatively heavy and requires a substantial amount of room for installation on each vehicle. This is a very heavy structure constructed to absorb many forces created by five seats across and five rows of guests in one vehicle and a relatively large and complex one as it includes a ratchet shaft connected with block ratcheting device that stands on a tower built in the boat. While most suitable for its intended purposes, it is relatively heavy and requires a substantial amount of room to accommodate.

Also, known complex guest positioning devices for land vehicles include discreet positions for locking the lap bars. It has been found that the discreet positions do not comfortably accommodate all guests since the range of sizes of guests attending the park is very large.

Accordingly, to date, no suitably light weight and compact device or method of positioning guests in a log flume boat is available.

BRIEF DESCRIPTION OF THE INVENTION

In accordance with an embodiment of the present invention, a guest lap bar locking assembly for releasably positioning a lap bar within a water ride at an entertainment park comprises a lap bar locking assembly that is dimensioned and configured to provide continuously variable position locking of the lap bar.

In accordance with another embodiment of the present invention, a guest lap bar locking assembly for releasably positioning a lap bar comprises a rotatable locking assembly hub and a cam extending from the locking assembly hub. The cam may comprise a generally rectangular configuration in cross section and a generally arcuate outer configuration. The cam may further comprise a generally smooth cam outer surface and at least one pawl, that in turn, comprises a pawl first aperture wherethrough the cam extends. The pawl first aperture is defined by a pawl first aperture surface that is engagable with the cam outer surface.

In accordance with a further embodiment of the present invention, a method of releasably positioning a lap bar within a watercraft usable at an entertainment park, comprises providing a continuously variable position locking of the lap bar.

BRIEF DESCRIPTION OF THE DRAWINGS

The following detailed description is made with reference to the accompanying drawings, in which.

DETAILED DESCRIPTION OF THE PREFERRED EMBODIMENT

One embodiment of the present invention concerns a device and a method for locating lap bars in a vehicle. The vehicle may comprise watercraft and, in one particular embodiment a log flume boat, and the lap bars may be interconnected with a lap bar locking assembly and a remote actuator.

Figure 1:
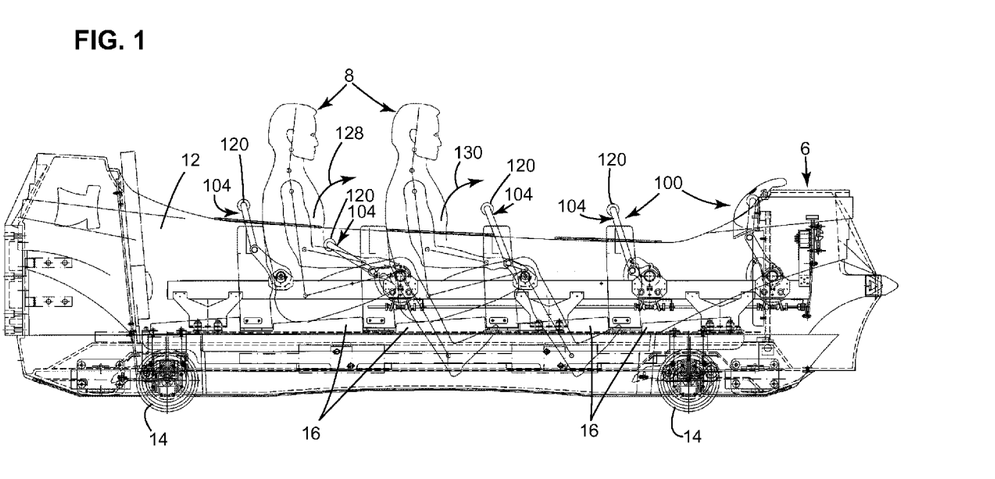
FIG. 1 is a diagram, taken from a side, showing a vehicle and guests seated in the vehicle which includes a guest positioning device including a lap bar assembly that comprises lap bars, lap bar locking assemblies and actuators in accordance with one embodiment of the present invention.

Referring now to FIG. 1, a vehicle 6 for transporting guests 8 is shown along with a lap bar assembly, in accordance with one embodiment of the present invention, which is illustrated generally at 100.

In this embodiment, the vehicle 6 comprises watercraft, particularly a log flume boat, that has a watertight body 12 and wheels 14 for traversing a ride track and/or a flume covered by shallow water (not shown). The guests are shown in the seated position on body supports 16. The body supports 16 may comprise individual seats having seat backs, in the case of a single-wide log flume boat, or in another embodiment bench seats, also having back support and holding multiple guests.

Figure 2:
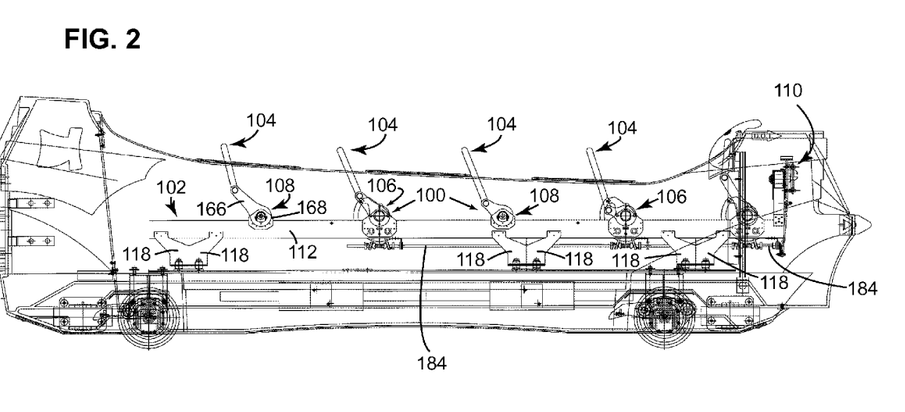
FIG. 2 is a diagram, taken from a side, showing a portion of the vehicle and further details of the lap bar assembly of FIG. 1.

Referring now to FIG. 2, the lap bar assembly 100 comprises a frame 102, lap bars 104, lap bar locking assemblies 106, lap bar free rotation assemblies 108 and actuator assemblies 110. Each of the components of the lap bar assembly 100 described below, and unless otherwise noted below, may comprise any suitably strong and durable material such as a zinc plated nickel alloy such as that sold under the trademark ASTRALLOY by the Astralloy Steel Products. Other optional embodiments include a composite or a metallic substance comprising, e.g., aluminum, steel and/or titanium. Materials may be chosen in a known manner, for example, based on strength, durability and mass.

Figure 3:
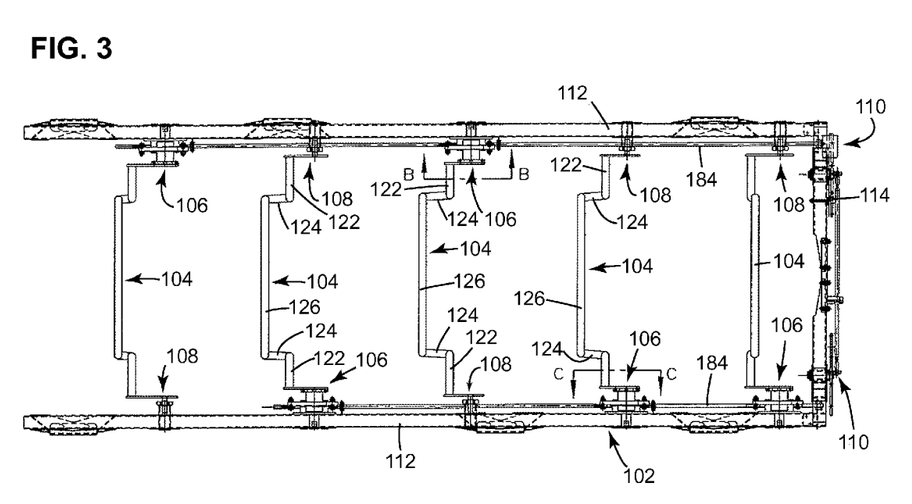
FIG. 3 is a diagram, taken from a top view, showing the lap bar assembly of FIG. 1.
Figure 6:
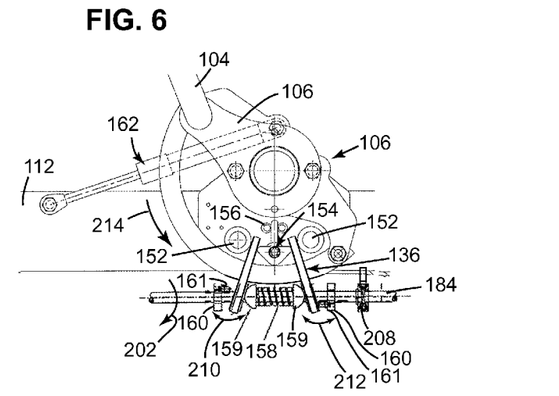
FIG. 6 is a diagram showing a further portion of a lap bar locking assembly of FIG. 1 including a portion of a lap bar and a bias for biasing the lap bar.

As seen in FIGS. 3 and 6, the frame 102 may comprise a pair of support rails 112 interconnected by a cross member 114 and cross member supports 116. Each of the support rails 112, cross member 114 and cross member supports 116 may comprise a generally rectangular cross section and each may further be bonded, welded and/or fastened together in a known manner.

Referring now to FIGS. 2 and 6, each support rail 112 may be connected to the watertight body 12 (see FIG. 2) via braces 118. The braces 118 may be bonded, welded and/or fastened to each of the support rail 112 and the watertight body 12 in a known manner.

As shown in FIGS. 1 and 3, the lap bars 104 each extend between a lap bar locking assembly 106 and a lap bar rotation assembly 108 and rotate to position a guest 8 in a seat 16. Each lap bar 104 may comprise a foam pad cover 120 to increase the comfort of each guest 8. Also, each lap bar 104 may comprise a continuous bar that may be dimensioned and configured in a known manner to comfortably position each guest. In this way, the continuous bar may comprise a pair of stub connectors 122, a pair of radial extenders 124 and a lap engaging bar 126 each of which may comprise a generally cylindrical outer configuration. The lap bar 104 rotates back and forth, as described in more detail below, in the directions of arrows 128 and 130.

As best seen in FIG. 3, the lap bar locking assemblies 106 and lap bar free rotation assemblies 108 may be positioned in an alternating fashion on opposing sides of each support rail 112 in order to even the distribution of weight. Although not shown as such, the locking assemblies 106 are preferably hidden from view behind a facade for safety.

Figure 4:
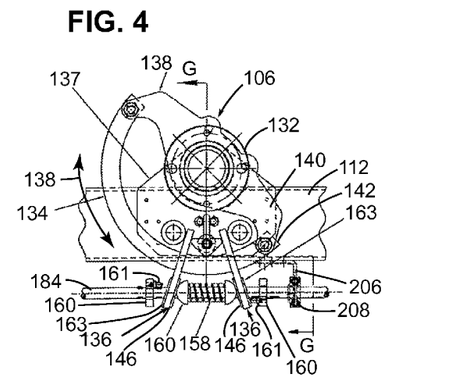
FIG. 4 is a diagram showing a portion of a lap bar locking assembly of FIG. 1.

The lap bar locking assemblies 106 are shown in more detail in FIG. 4 and each comprise a locking assembly hub 132, locking assembly cam 134, and pawls 136. The locking assembly hub 132 may be mounted to a support rail 112 via a bracket 137 and comprises a rotatable flange (not numbered) connected via a suitable known bearing (not shown) that is rotatable as shown by arrow 138. A pair of locking assembly arms 140 extend from the rotatable flange and terminate in a pair of fasteners 142 which function to support the locking assembly cam 134.

In this embodiment and in accordance with a feature of the present invention, the locking assembly cam 134 is generally arcuate in configuration and may be generally rectangular in cross section. The arcuate configuration is particularly advantageous as it reduces an overall dimension of the locking assembly cam 134, and thereby increases the compactness of the lap bar locking assemblies 106, as compared with known linear cam configurations. Also, the arcuate configuration obviates use of a pivoting lap bar thereby making a less complex and more reliable system. The radius of curvature of the locking assembly cam 134 may vary depending on the desired application and, e.g., the desired angular sweep of the lap bar 104.

Figure 5:
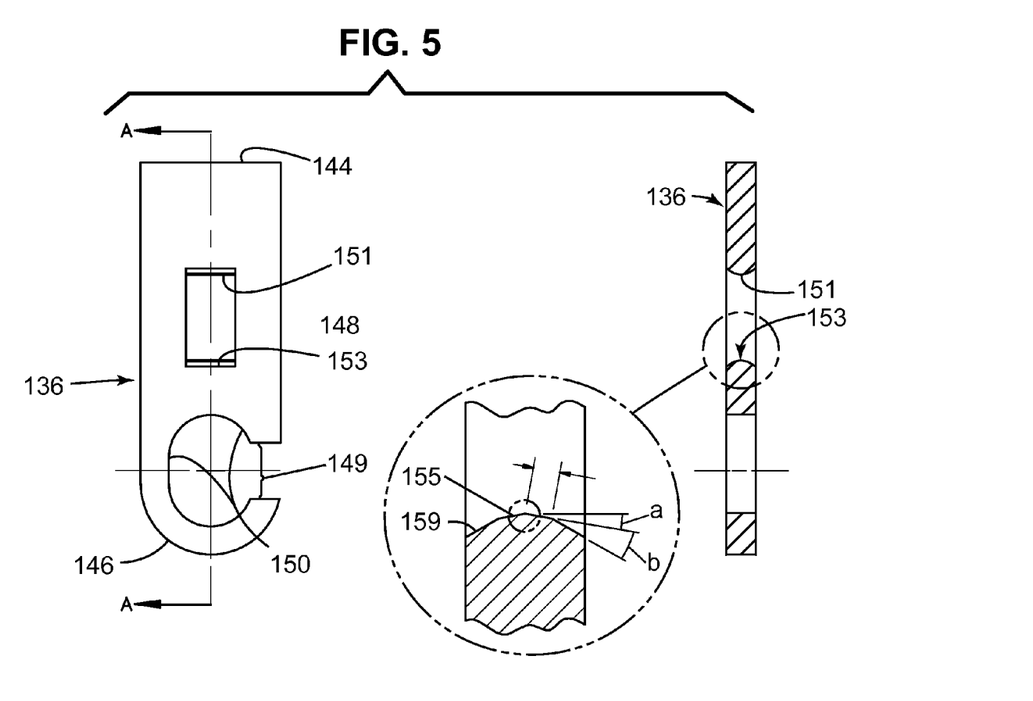
FIG. 5 is a top plan view of a pawl, a separate sectional view taken along line A-A the pawl and an enlarged view of a portion the pawl in accordance with the embodiment of FIG. 1.

Referring now to FIGS. 4-6, the pawls 136, each comprise a positioned end 144, a free end 146, a first aperture 148 and a second aperture 150. Each positioned end 144 is located between a pair of round pins 152 and a travel limiter 154. The travel limiter 154 comprises an elongated portion and a triangular portion (neither numbered) that are configured in shape to provide limited surface area to reduce frictional contact between each pawl 136 and the round pins 152 and travel limiter 154. During assembly, the travel limiter 154 may be fixed in place between two travel limiter support pins 156 while urging the pawls 136 against the round pins 152.

The first aperture 148 is defined by a pawl first aperture surface including two working surfaces 151 and 153 that each of which may include multiple angled surfaces as shown to enhance engagement with the cam 134 during rotation of the pawl 136, described below. As shown, a first surface 155 may be formed at an angle a of approximately 10 degrees and a second surface 157 may be formed at an angle b of approximately 30 degrees. As shown, the first aperture may be generally rectangular in configuration for mating with the locking assembly cam 134. The second aperture 150 may be generally elongated or elliptical in configuration for preventing contact with a telegraph rod, which is described in more detail below, and including an opening 149 usable for assembly and disassembly of the telegraph rod.

A bias such as a coil spring 158 is disposed between each of the free ends 146 of the pawls 136 to bias the pawls in opposing directions. The coil spring 158 may comprise caps 159 which are provided for preventing binding of the spring with a washer 163. Washers 163 may be disposed adjacent sides of each pawl 136 to create a full contact surface between each pawl and the caps 159. A pair of collars 160 is located outside of each of the pawls 136 and engagement pins 161 are mounted to the collars. Each engagement pin 161 may be mounted at a position that is shown as being rotated at an angle of approximately 120 degrees from each other. It will be understood that in the practice of this invention, no rotation, i.e., a rotation of zero degrees from each other is also possible to provide locking in only one direction of rotation of the lap bar 104.

As shown in FIG. 6, the lap bar 104 may be biased in an upright position (see FIG. 2) by any suitable means such as a coil spring or an air pressure shock 162. The air pressure shock 162 is interconnected with the locking assembly hub 132 via locking assembly arm 140. A connector plate 164 is provided for connecting the lap bar 104 to the locking assembly hub 132.

Referring again to FIG. 2, as illustrated lap bar free rotation assemblies 108 are provided, although in an optional embodiment these may be replaced by locking assemblies 106 for redundancy. Where provided each free rotation assembly comprises a connector plate 166 connected between a lap bar 104 and a rotatable hub 168. The rotatable hub 168 may be welded or fastened to a support rail 112.

Figure 7:
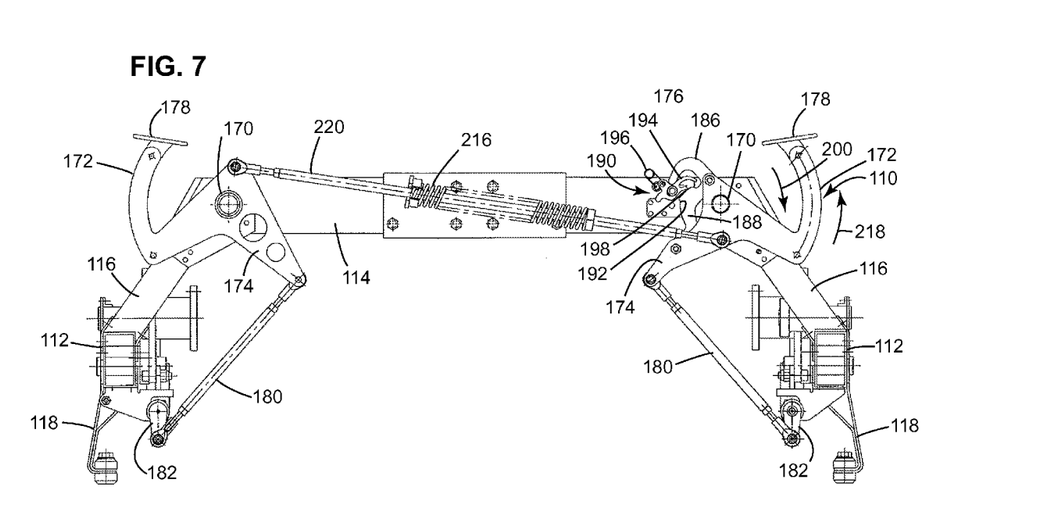
FIG. 7 is a front view of the frame assembly shown in FIG. 3 including further details of the actuators.

As best seen in FIGS. 2 and 7, the actuator assembly 110 comprises an actuator hub 170, an operator arm 172, a telegraph arm 174 and a toggle latching assembly 176. The actuator hub 170 is rotatable and is supported by the cross member 114. The operator arm 172 may extend from the actuator hub 170 and terminate in an actuator foot pedal 178. The telegraph arm 174 may also extend from the actuator hub 170 and the shaft arm may be, as shown, integral with the operator arm 172. The telegraph arm 174 is interconnected with a telegraph rod link 180 and a telegraph rod radial extender 182. The telegraph rod radial extender 182 is interconnected with a telegraph rod 184 (best seen in FIG. 2).

Figure 8:
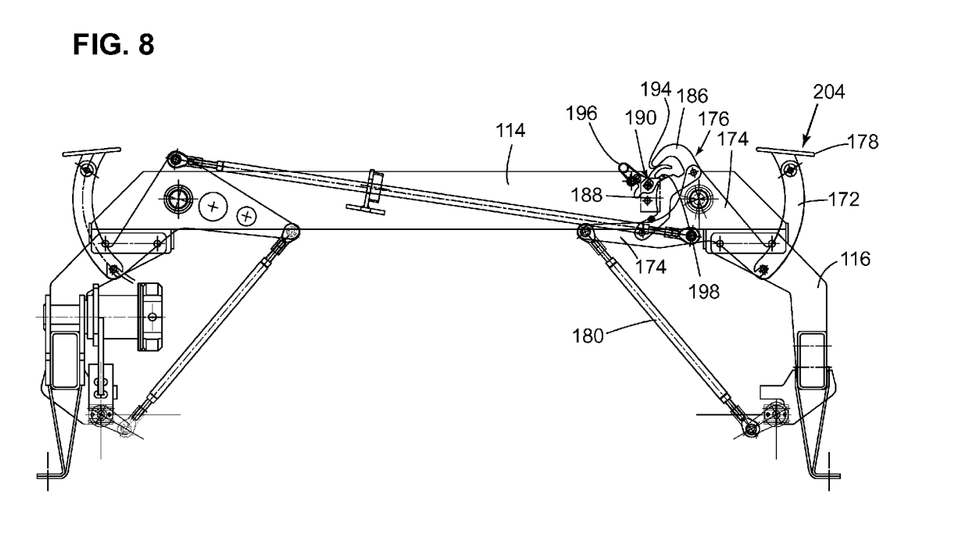
FIG. 8 is another front view of the frame assembly of FIG. 7 wherein the actuator has been rotated to a mid-way position.
Figure 9:
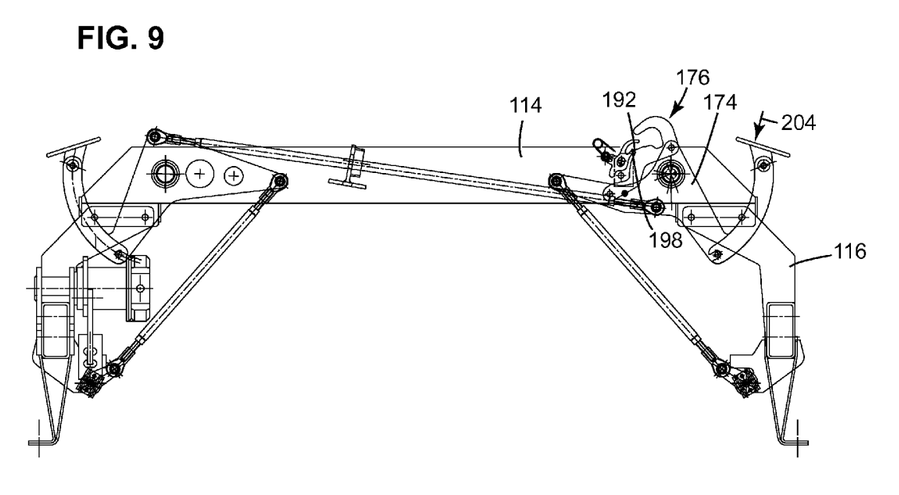
FIG. 9 is a further front view of the frame assembly of FIG. 7 wherein the actuator has been rotated to a second position.
Figure 10:
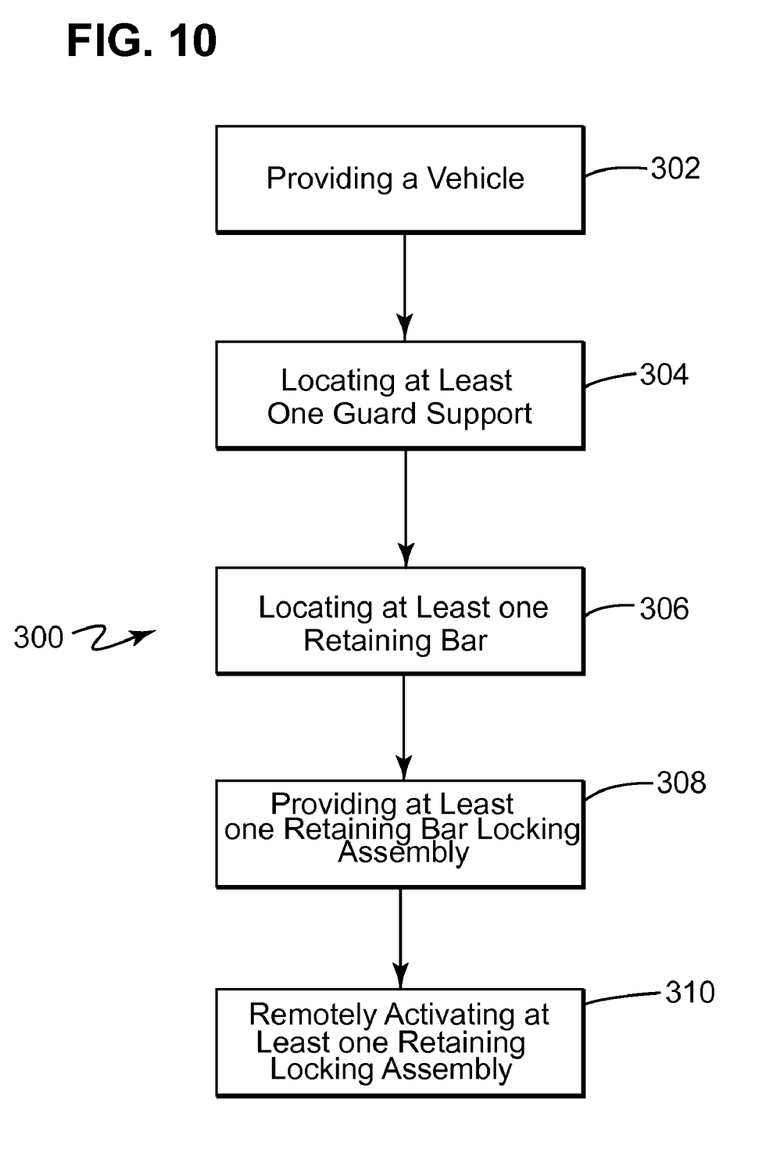
FIG. 10 is a flow chart showing a method in accordance with another embodiment of the present invention.

As shown in FIGS. 7 through 9, the toggle latching assembly 176 comprises a finger 186, a slide cam 188 and a rotatable latch or toggle 190. The finger 186 functions to urge the toggle 190 in a clockwise direction. The slide cam 188 may be formed integrally with the finger 186 and comprises a protrusion 192. The toggle 190 comprises a latch finger 194, latch spring 196 and a catch 198. The latch finger 194 is biased by the spring 196 such that the catch 198 may engage the protrusion 192 that is correspondingly shaped to an end (not numbered) of the catch 198.

Operation of the actuator assembly 110 is readily seen when viewing FIGS. 7, 8 and 9 in sequence. When the operator arm 172 is forced downward in the direction of arrow 200 the catch moves from a disengaged position (FIG. 7) to a mid-way position (FIG. 8) to an engaged position (FIG. 9). At this time, the telegraph rod 184 (FIG. 2) is rotated, in the direction of arrow 202 (FIG. 6) via movement of the telegraph arm 174, telegraph rod link 180 and telegraph rod radial extender 182. The operator arm 172 may then be forced again in the direction of arrow 204 (FIG. 8) to return the toggle latching assembly from the position shown in FIG. 9, to the position shown in FIG. 7.

Referring again to FIGS. 2 and 6, the telegraph rod 184 extends to each of the lap bar locking assemblies 106 and through each of the second apertures 150 of each of the pawls 136. The telegraph rod 184 may be supported by a bracket 206 and bearing 208 mounted to the support rail 112. Located on opposing sides of each of the pawls 136 are each of the collars 160 and engagement pins 161. Upon rotation of the telegraph rod in the direction of arrow 202, as described above in connection with FIGS. 7 and 8, each of the collars 160 are rotated, between approximately 60 degrees and approximately 120 degrees depending upon the space available, whereby the engagement pins 161 alternately engage or disengage from a pawl 136 in the direction of arrows 210 and 212 and in cooperation with urging from the coil spring 158. This rotation allows for movement of the locking assembly cam 134 in the direction of arrow 214, and in turn, rotation of lap bar 104 in the direction of arrow 130 (see FIG. 1).

As seen in FIG. 7, the actuator assembly 110 may also comprise a bias such as a coil spring 216 that biases the actuator arm 172 in the direction of arrow 218 and a connector rod 220. The coil spring 216 may provide sufficient force, which may be between approximately twenty and approximately twenty-five pounds, to overcome friction and prevent inadvertent actuation.

As also seen in FIG. 7, another actuator assembly 110 may also be provided which comprises another actuator hub 170, another operator arm 172 and foot pedal 178, and another telegraph arm 174 that operates another telegraph rod link 180 and, in turn, another telegraph rod radial extender 182. As shown and as is apparent, another latching assembly 176 may be omitted from the additional actuator assembly 110 because of the use of the connecting rod 220. The telegraph rod radial extender 182 is interconnected with another telegraph rod 184. This symmetric system is best seen in FIG. 3 and the operation of which is referred to above as either side may be operated in a similar manner.

In accordance with another embodiment of the present invention, a method of securing at least one guest on an entertainment apparatus is shown generally at 300 in FIG. 9. The method comprises, as shown at 302, providing a vehicle and, as shown at 304, locating at least one guest support on the vehicle. As shown at 306, locating at least one lap bar proximal to the at least one support that is configured to releasably position at least one guest, as shown at 308, providing at least one lap bar locking assembly for releasably positioning the at least one lap bar, and as shown at 310, remotely actuating the at least one lap bar locking assembly to enable or prevent movement of the lap bar.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A guest lap bar locking assembly for releasably positioning a lap bar, comprising:
    a rotatable locking assembly hub;
    a cam extending from the locking assembly hub, the cam comprising a generally rectangular configuration in cross section and a generally arcuate outer configuration, the cam further comprising a generally smooth cam outer surface; and
    at least one pawl comprising a pawl first aperture wherethrough the cam extends and being defined by a pawl first aperture surface, the pawl first aperture surface being engageable with the cam outer surface.

2. The apparatus of claim 1, wherein:
    the cam comprises a pair of cam fasteners each located at opposing ends of the cam for mounting thereof and
    the at least one pawl comprises a pair of pawls each pawl comprising a pawl positioned end and a pawl free end, each free end having a pawl second aperture configured such that a telegraph rod is extendable through each pawl second aperture.

3. The apparatus of claim 2, wherein each pawl positioned end is interleaved between a pair of pawl pins and a central travel limiter having a generally triangular outer configuration, each pawl pin and the travel limiter are dimensioned and configured to provide for a rotation of a respective pawl and further comprising:
    a pair of collars supported by the telegraph rod and each collar being spaced along the telegraph rod such that both pawls are disposed therebetween and wherein each collar comprises a collar pin extending in opposing directions toward each pawl free end; and
    a pawl bias located on the telegraph rod and being disposed between each pawl free end.

4. The apparatus of claim 3, further comprising a hub bias for biasing the locking assembly hub for rotation in one particular direction.

5. The apparatus of claim 3, wherein the pawl bias comprises a coil spring.

6. The apparatus of claim 5, wherein the hub bias comprises a pressurized shock.

7. The apparatus of claim 1, wherein the first pawl aperture is bounded by a pair of working surfaces each comprising multiple angled surfaces.

8. The apparatus of claim 7, wherein the at least one of the multiple angled surfaces comprises an angle of about ten degrees and another of the multiple angled surfaces comprises an angle of about thirty degrees.

9. The apparatus of claim 1 further comprising a plurality of lap bar locking assemblies each supported by a frame and each configured to releasably lock a lap bar and further comprising an entertainment apparatus for a plurality of guests, comprising:
    a watercraft;
    a plurality of guest supports located on the watercraft and wherein each of the plurality of lap bar locking assemblies and lap bars are located proximal to one of the guest supports and are configured to releasably position a guest; and
    at least one actuator, the at least one actuator configured to remotely actuate the at least one lap bar locking assembly to enable movement of the lap bar.

10. The apparatus of claim 9, further comprising a telegraph rod interconnected between each of the lap bar locking assemblies and the at least one actuator, the telegraph rod being rotatable by the at least one actuator to actuate the lap bar locking assembly to prevent movement of the lap bar in at least one particular direction.

11. The apparatus of claim 10, wherein the at least one actuator comprises:
a rotatable actuator hub;
an telegraph arm extending from the actuator hub and being interconnected with the telegraph rod;
an operator arm also extending from the actuator hub; and
a toggle latching assembly interconnected with the actuator hub, the toggle latching assembly providing for toggling between the first position that actuates the lap bar locking assembly for preventing the movement of the lap bar in the one particular direction or a second position that actuates the lap bar locking assembly for preventing movement of the lap bar in the opposing direction.

12. The apparatus of claim 11, wherein the operator arm comprises a foot pedal.

13. The apparatus of claim 12, wherein the at least one actuator comprises a pair of actuators and wherein the actuators are connected together via a connector rod.

14. The apparatus of claim 11, wherein the toggle latching assembly comprises:
an actuator finger extending from the actuator hub;
a protrusion located on a slide cam extending from the actuator hub; and
a toggle comprising a latch finger that is configured to slide adjacent the actuator finger and a catch finger configured to engage the protrusion.

15. The apparatus of claim 11, wherein the at least one actuator further comprises:
an telegraph rod link extending from the telegraph arm; and
a telegraph rod radial extender interposed between the telegraph rod link and the telegraph rod.

16. The apparatus of claim 11, wherein each lap bar locking assembly is located at one end of each lap bar and further comprising a plurality of lap bar free rotation assemblies each being disposed at an opposing end of each lap bar.

17. The apparatus of claim 16, wherein the lap bar locking assemblies and the lap bar free rotation assemblies are generally distributed on alternating sides of the watercraft to reduce uneven weight distribution.

18. The apparatus of claim 11, wherein each lap bar is lockable in an upright position so that it may be used as a hand rail by a guest.

19. A method of releasably positioning a lap bar within a watercraft usable at an entertainment park, comprising:
providing at least one lap bar assembly for continuously variable position locking of the lap bar; and
remotely actuating the at least one lap bar locking assembly via a telegraph rod for actuating a rotable cam and a pair of pawls engagable with the rotatable cam to prevent movement of the lap bar in one direction.

20. A method of releasably positioning a lap bar within a watercraft usable at an entertainment park, comprising:
providing at least one lap bar locking assembly providing for continuously variable position locking of the lap bar;
remotely actuating the at least one lap bar locking assembly by toggling between a first position of the lap bar that prevents movement of the lap bar in one particular direction and a second position of the lap bar that prevents movement in an opposing direction; and
wherein remotely actuating the at least one lap bar locking assembly further comprises using a foot pedal to toggle between the first position and the second position.

* * * * *